United States Patent
Posamentier

(10) Patent No.: US 7,570,920 B2
(45) Date of Patent: Aug. 4, 2009

(54) AM-FM HYBRID SIGNAL COMMUNICATED TO RFID TAGS

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 11/184,437

(22) Filed: Jul. 19, 2005

(65) Prior Publication Data

US 2007/0021074 A1 Jan. 25, 2007

(51) Int. Cl.
*H04B 1/00* (2006.01)
(52) U.S. Cl. .................. 455/61; 455/41.1; 455/106; 455/108; 455/23; 340/854.6; 340/855.4; 340/855.7
(58) Field of Classification Search ............. 455/41.1, 455/41.2, 61, 102, 104, 106, 108, 131, 23, 455/17; 340/854.6, 855.4, 855.7
See application file for complete search history.

(56) References Cited

U.S. PATENT DOCUMENTS

| | | | | |
|---|---|---|---|---|
| 5,396,484 A | * | 3/1995 | Itoh | ................ 370/204 |
| 5,995,019 A | * | 11/1999 | Chieu et al. | ............. 340/10.32 |
| 2005/0058292 A1 | * | 3/2005 | Diorio et al. | ................ 380/270 |

* cited by examiner

*Primary Examiner*—Tuan A Pham
(74) *Attorney, Agent, or Firm*—Lee & Hayes, PLLC; Jason F. Lindh

(57) ABSTRACT

An AM-FM hybrid signal is created which may be used to communicate simultaneously with both RFID tags that receive AM signals and wireless devices that receive FM or PM signals. The AM-FM hybrid signal may be fed back into the system's receiver at the local oscillator in order to recover the RFID tag's FM response, thus enabling simultaneous reception and decoding of both RFID tag FM response and FM wireless device response.

8 Claims, 4 Drawing Sheets

AM-FM HYBRID SIGNAL COMMUNICATED TO RFID TAGS

BACKGROUND

Radio frequency identification (RFID) tags are relatively low cost wireless devices. RFID tags are typically used in tracking, identification, and communication. RFID tags include circuits that have a processor, a memory, an analog to digital converter/digital to analog converter, and an antenna. RFID tags may be classified as passive or active, where passive RFID tags rely on an external power supply and active RFID tags include a power supply. RFID tags may be attached as a "sticker" to or embedded into products, animals, and even people.

RFID tags operate in different frequency spectrums, ranging from low frequency (e.g., 125 Khz) to microwave frequency. The RFID tag frequency used typically depends on an application of the RFID tag.

Examples of applications for RFID tags include animal identification, inventory (e.g., library books, beer kegs, etc.) tracking, automobile key and lock activation (i.e., "smart key" technology), badge identification, etc. Furthermore, new applications continue to evolve using RFID tags, such as the replacement of current universal product code (UPC) tracking systems with RFID tag systems.

RFID tags may be part of a larger RFID system that can include tag readers, tag programming stations, circulation readers, sorting equipment and tag inventory wands. In general, there may be a wireless access point (WAP) such as a network interface card (NIC) that connects (i.e., allows communication between) a computing device (e.g., computer) to RFID tags.

RFID tags are full duplex devices, meaning that they are able to send and receive communications. In particular, RFID tags send and receive communications to and from WAPs of an RFID system. Although other wireless devices may be able to receive communication from RFID tags (i.e., upstream communication from an RFID tag which can either be transmitted or backscattered), these wireless devices may not be able to send communication to the RFID tags (i.e., downstream communication from an RFID tag). Examples of such wireless devices include WAPs of wireless local area networks (e.g., IEEE 802.11 based), global systems for mobile (GSM) based cellular telephones, Bluetooth enabled devices, sensor network access points, etc. For example, if an RFID tag enters a WLAN system, WAPs of the WLAN system may be able to read from (i.e., receive communications) to the RFID tag; however, the WAPs are not able to write to (i.e., send communications) to the RFID tag.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DESCRIPTION OF THE EMBODIMENTS

Figure 1:
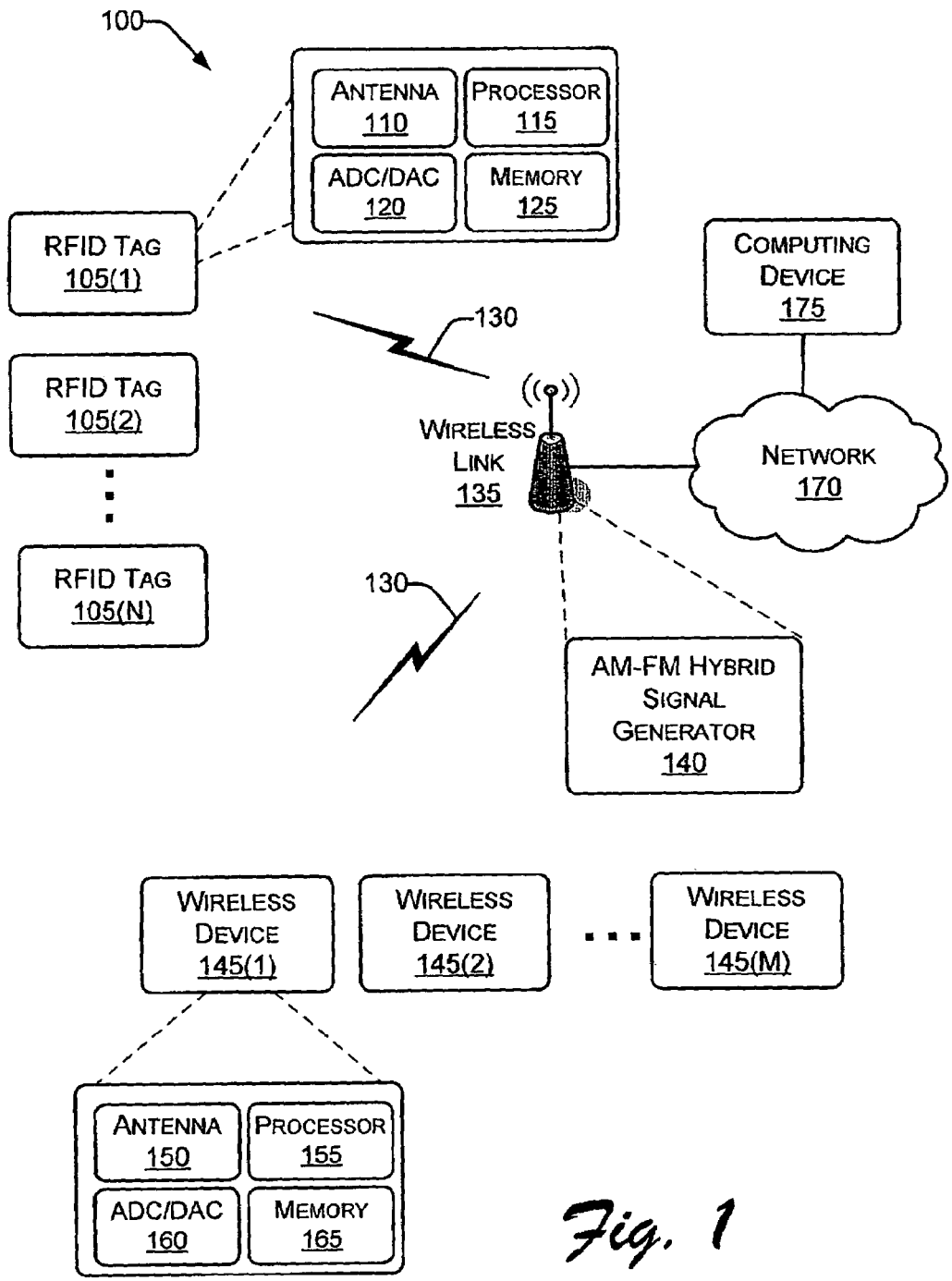
FIG. 1 is an illustration of an example RFID wireless device system with multiple RFID tags, wireless devices, and a wireless link configured to communicate with the RFID tags and wireless devices.

FIG. 1 illustrates an example RFID system 100. RFID system 100 includes multiple radio frequency identification (RFID) tags 105(1), 105(2) . . . 105(N) which may be included in or attached to various items, including product inventory, animals, people, etc. Furthermore, RFID tags 105(1)-105(N) include devices that incorporate or use RFID communication technology. As represented by RFID tag 105(1), each of the RFID tags 105, includes an antenna 110, a processor 115, an analog (RF) to digital converter/digital to analog (RF) converter (which may include a zero IF mixer and baseband analog to digital converter as well) 120, and a memory/storage 125.

RFID tags 105 are configured as full duplex devices, receiving communications (signals) in amplitude modulation (AM), and transmitting (sending) or backscattering a carrier via frequency modulation (FM). In this example, RFID tags 105 receive an AM-FM hybrid signal 130 from a wireless link 135. The RFID tags 105 process amplitude domain information conveyed in the AM-FM hybrid signal 130 as to communication information. The wireless link 135 includes an AM-FM hybrid signal generator 140 used to produce the AM-FM hybrid signal 130. Furthermore, wireless link 135 receives signals from RFID tags 105 in the form of typically transmitted RFID FM signals.

Wireless link 135 may be a wireless access point (WAP) or a wireless network interface card (NIC). In certain embodiments, wireless link 135 may be an RFID reader/writer. As discussed below, other devices may also be included in wireless link 135.

The RFID system 100 includes multiple wireless devices 145(1), 145(2) . . . 145(M). Examples of wireless devices 145(1)-145(M) include Bluetooth enabled and IEEE 802.11 devices, which include devices such as laptop computers, cellular telephones, and personal digital assistants (PDAs). Wireless devices 145(1)-145(M) are full duplex, transmitting (sending) and receiving communications in FM or a variety of phase modulation schemes. As represented by wireless device 145(1), each of the wireless devices 145, includes an antenna 150, a processor 155, an analog (RF) to digital converter/digital to analog (RF) converter 160, and a memory/storage 165.

Wireless devices 145 receive the AM-FM hybrid signal 130 from wireless link 135. The wireless devices 145 processes frequency domain information conveyed in the AM-FM hybrid signal 130 as to communication information. The wireless link 135 receives signals from wireless devices 145 in the form of typically transmitted FM signals. Any AM content is eliminated through AC coupling/high pass filtering and automatic gain control on their receiver front ends.

Therefore as to communications sent to RFID tags 105 or wireless devices 145, the AM-FM hybrid signal 130 is used to communicate either to the AM signal receiving RFID tags 105 or the FM signal receiving wireless devices 145. The RFID tags 105 process the AM-FM hybrid signal 130 based on the amplitude domain, and the wireless devices 145 process the AM-FM hybrid signal 130 based on the frequency domain.

In this embodiment, wireless link 135 is coupled to a network 170. In particular, wireless link 135 is a WAP of the network 120. Network 170 includes, but is not limited to, wireless local area networks (WLAN), wireless wide area networks (WWAN), worldwide interoperability for microwave access (WiMax), wireless personal area networks (WPAN), wireless metropolitan area networks (WMAN), global system for mobile communications (GSM) cellular radiotelephone systems, and the like. In at least one implementation, for example, the wireless link 135 may be implemented in accordance with the Bluetooth short range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards), IEEE 802.16 (ANSI/IEEE Std 802.16-2002, IEEE Std 802.16a, March 2003 and related standards), HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July 2002 and related specifications), and/or others.

The network 170 may include or connect other devices such as computing device 175. In particular, computing device 175 may use wireless link 135 to communicate (i.e., receive and send information) to RFID tags 105 and wireless devices 145. In particular, computing device 175 is able to send communications to RFID tags 105 and wireless devices 145 through the use of the AM-FM hybrid signal 130.

Figure 2:
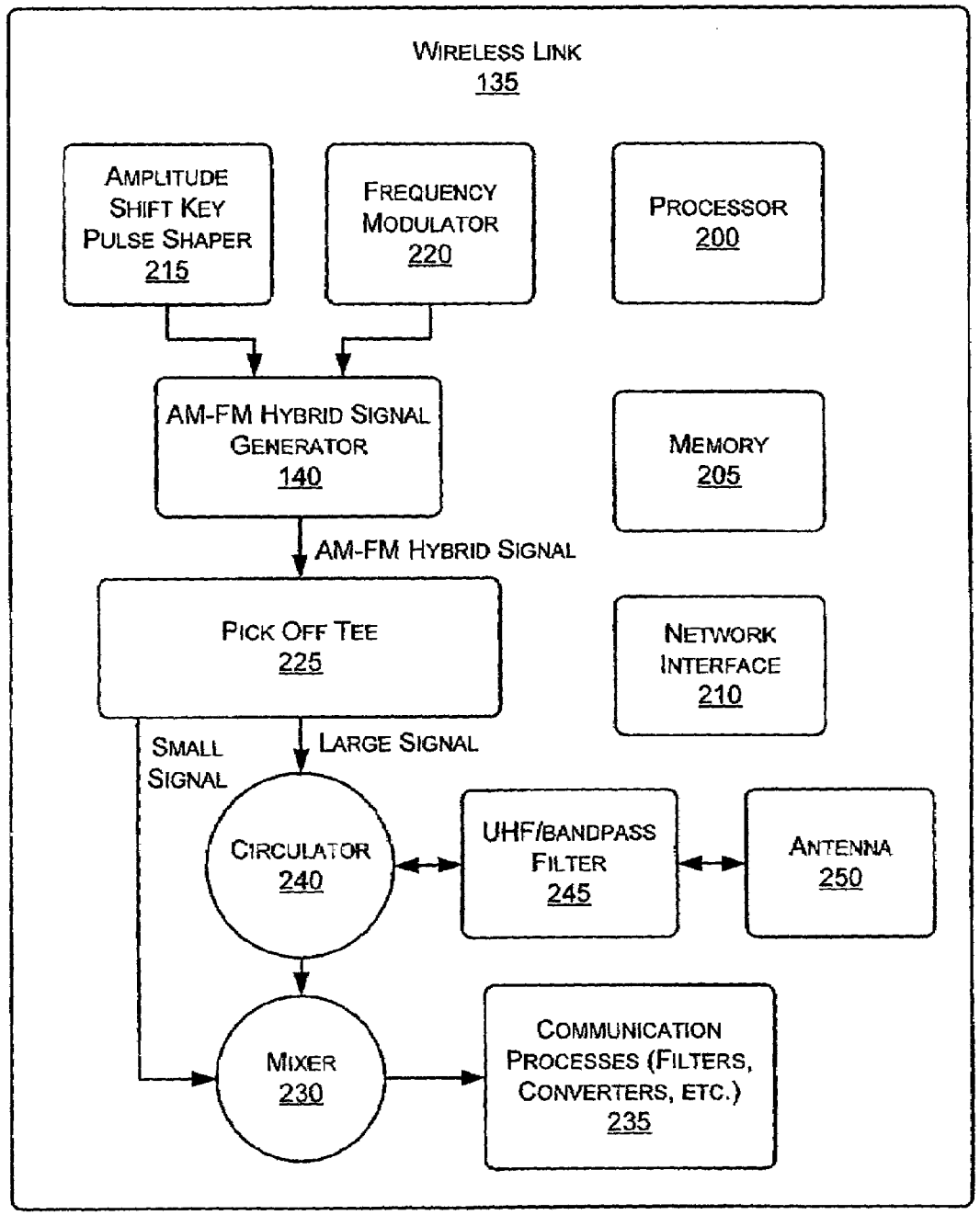
FIG. 2 is a block diagram showing an example of a circuit that may be implemented in the wireless link of FIG. 1.

FIG. 2 illustrates selected functional components of a circuit that may be included in wireless link 135. In this embodiment, wireless link 135 includes a central processing unit or processor 200, a storage unit or memory 205, and a network interface 210 used to communicate with a network such as network 120 of FIG. 1. In other embodiments, wireless link 135 may rely on external devices to provide functions performed by processor 200 and memory 205. Such external devices may include computer 175 described in FIG. 1.

Wireless link 110 includes an amplitude shift key (ASK) pulse shaper 215 generating amplitude modulated (AM) signals. In particular, the AM signals support communications to RFID tags 105. Specifically, an AM pulse is shaped by ASK pulse shaper 215, where the AM pulse represents AM signals communicated or sent to RFID tags from wireless link 135. In certain embodiments, the ASK pulse shaper 215 may be a digital to analog converter (DAC).

Wireless link 135 includes a frequency modulator 220 that provides frequency modulated (FM) or Gaussian Minimum Shift Key (GMSK) based signals, collectively referred to as FM signals. In particular, the FM signals support communications to wireless devices 145. Specifically, the carrier is modulated in the time domain by the frequency modulator 220, where the frequency modulation represents FM signals communicated or sent to wireless devices 145.

The AM-FM hybrid signal generator 140 as described in FIG. 1 receives the AM pulse from ASK pulse shaper 215 and the FM pulse from frequency modulator 220 and produces or generates an AM-FM hybrid signal. In specific, the received AM pulse modulates in the amplitude domain a signal generated by the AM-FM hybrid signal generator 140. The FM pulse from the frequency modulator 220 modulates in the frequency domain the signal generated by the AM-FM hybrid signal generator 140. Therefore, the AM-FM hybrid signal generated by the AM-FM hybrid signal generator 140 is modulated in the amplitude domain by the AM pulse from ASK pulse shaper 215 and modulated in the frequency domain by the FM pulse from the frequency modulator 220.

Since RFID tags 105 receive communications as AM signals, the RFID tags 105 look to the amplitude domain information conveyed in the AM-FM hybrid signal; however, the frequency modulator 220 provides a proper FM pulse so that the AM-FM hybrid signal is properly spaced in conveying correct signal information to the RFID tags 105.

Because the wireless devices 145 receive communications as FM signals, amplitude domain information conveyed in the AM-FM hybrid signal is ignored by the wireless devices 145. Therefore, the FM pulse generated by the FM modulator 220 and conveyed in the AM-FM hybrid signal is representative of signal information to the wireless devices 145.

Examples of AM-FM hybrid signal generator 140 include amplifiers or power amplifiers. In such implementations, an amplifier receives the FM pulse from frequency modulator 220 and the amplifier's is adjusted in the amplitude domain by the AM pulse from ASK pulse shaper 215 to generate the AM-FM hybrid signal.

The AM-FM hybrid signal is sent to a pick off tee 225 that performs the function of a power splitter. The pick off tee 225 splits the received AM-FM hybrid signal into two signals, a higher energy signal (large signal) and a lower energy signal (small signal). Example values are the large signal receiving about 99% (relative energy) of the original received AM-FM hybrid signal and the small signal receiving about 1% (relatively energy) of the original received AM-FM hybrid signal.

The large signal is used for transmission. In other words, the large signal is representative of the AM-FM hybrid signal to be transmitted to RFID tags 105 or wireless devices 145. The small signal is used for local processes, such as for receive chain processes (i.e., receiving signals), and signal monitoring.

The small signal is sent to a mixer 235 that acts as a local oscillator to support RFID communication. The small signal is particularly used as a reflected signal to support full duplex RFID communication. The reflected signal when used with a received signal, cancels out transmit-path noise, phase noise, and effects of frequency shifting. An adjusted signal (i.e., clean signal without noise) is sent to various local communication processes 240 used to read communications from RFID tags, perform received signal filtering, signal conversion, and other processes.

The large signal is sent to a circulator 240. In this example, circulator 240 is a three port device where each port is directional looking. Specifically, circulator 240 receives the large signal from pick off tee 230 at a first port, where the large signal is representative of a transmission ready signal (i.e., signal that is to be sent from wireless link 135). The large signal is passed by circulator 240 to a bandpass filter 245. From the bandpass filter 245, the large signal representative of the AM-FM hybrid signal is transmitted by antenna 250 to one or more of RFID tags 105 and/or wireless devices 145.

The antenna 250 is also used to receive signals from RFID tags 105 and/or wireless devices 145, and may be one of a number of different low profile antenna types including, for example, a dipole, a loop, a patch, and/or others. A received signal from the antenna 250 goes to bandpass filter 245 which receives and filters frequency specific signals.

For received signals, and particularly signals received from RFID tags 105, the received signals are sent to the circulator 240 at a second port and passed through a third port of the circulator 240 to the mixer 230. As described above, the received signal is used with the small signal or reflected signal to support communication processes, and particularly in receive chain processes (i.e., receiving communications).

Although the embodiment illustrated in FIG. 1 describes a wireless link 135 coupled to or as part of a network 170, it is contemplated that other devices may incorporate the circuit represented by the block diagram of FIG. 2, for example, a cellular telephone (e.g., GSM enabled cellular telephone), Bluetooth device, and other wireless device that particularly use FM signals to send communications. In other words, the circuit described in FIG. 2 may be incorporated in a device to allow the device to communicate with RFID tags 105 and wireless devices 145.

Figure 3:
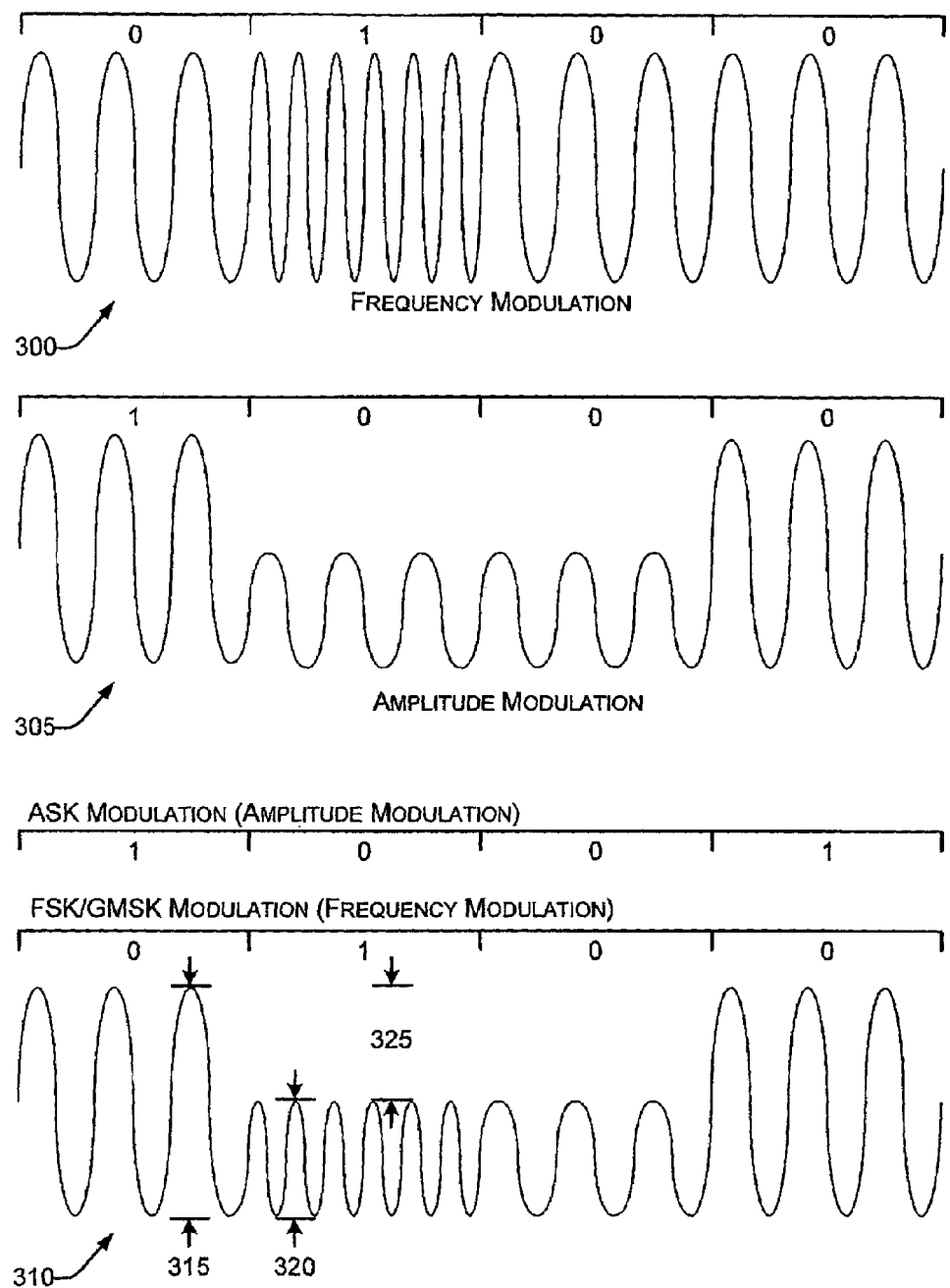
FIG. 3 is an illustration of modulated signals used in communications between the wireless link of FIG. 1 and RFID tags and wireless devices.

FIG. 3 illustrates a set of modulated signals to demonstrate generation an AM-FM hybrid signal. Signal 300 is a frequency modulated signal used to communicate to FM signal based devices. Over a particular time (i.e., defined period), a lower frequency in signal 300 is indicative of a "0" value while a higher frequency in signal 300 is indicative of a "1" value. Signal 300 is representative of FM signals created by frequency modulator 220 of FIG. 2. In general, the AM component of the waveform shall be modulated much more slowly than the FM component.

Signal 305 is an amplitude modulated signal used to communicate to RFID tags. Over a particular time (i.e., defined period), a lower amplitude in signal 305 is indicative of a "0" value while a higher amplitude in signal 305 is indicative of a "1" value. Signal 305 is representative of Am signals created by ASK pulse shaper 215 of FIG. 2.

Signal 310 is an AM-FM hybrid signal produced by combining the FM signal 300 with AM signal 305. Signal 305 is an example of AM-FM hybrid-signal 130 used to communicate (i.e., send information) to either FM signal based wireless devices 145 or AM signal based RFID tags 105. For FM signal based wireless devices 145, regardless of amplitude, a lower frequency in signal 310 is indicative of a zero value, while a higher frequency in signal 310 is indicative of a "1" value. For RFID tags, regardless of period or frequency, a lower amplitude in signal 310 is indicative of a "0" value, while a higher amplitude in signal 310 is indicative of a "1" value. Therefore, the AM-FM hybrid signal 310 may be used either for RFID tags 105 or wireless devices 145.

For higher amplitudes of signal 310, example values, as illustrated by space 315, are approximately 30 dBm (1 Watt). For lower amplitudes of signal 310, example values, as illustrated by space 320, are approximately 27 dBm (500 mW). The difference between higher amplitudes and lower amplitudes, as illustrated by space 325, is approximately 3 dB.

Figure 4:
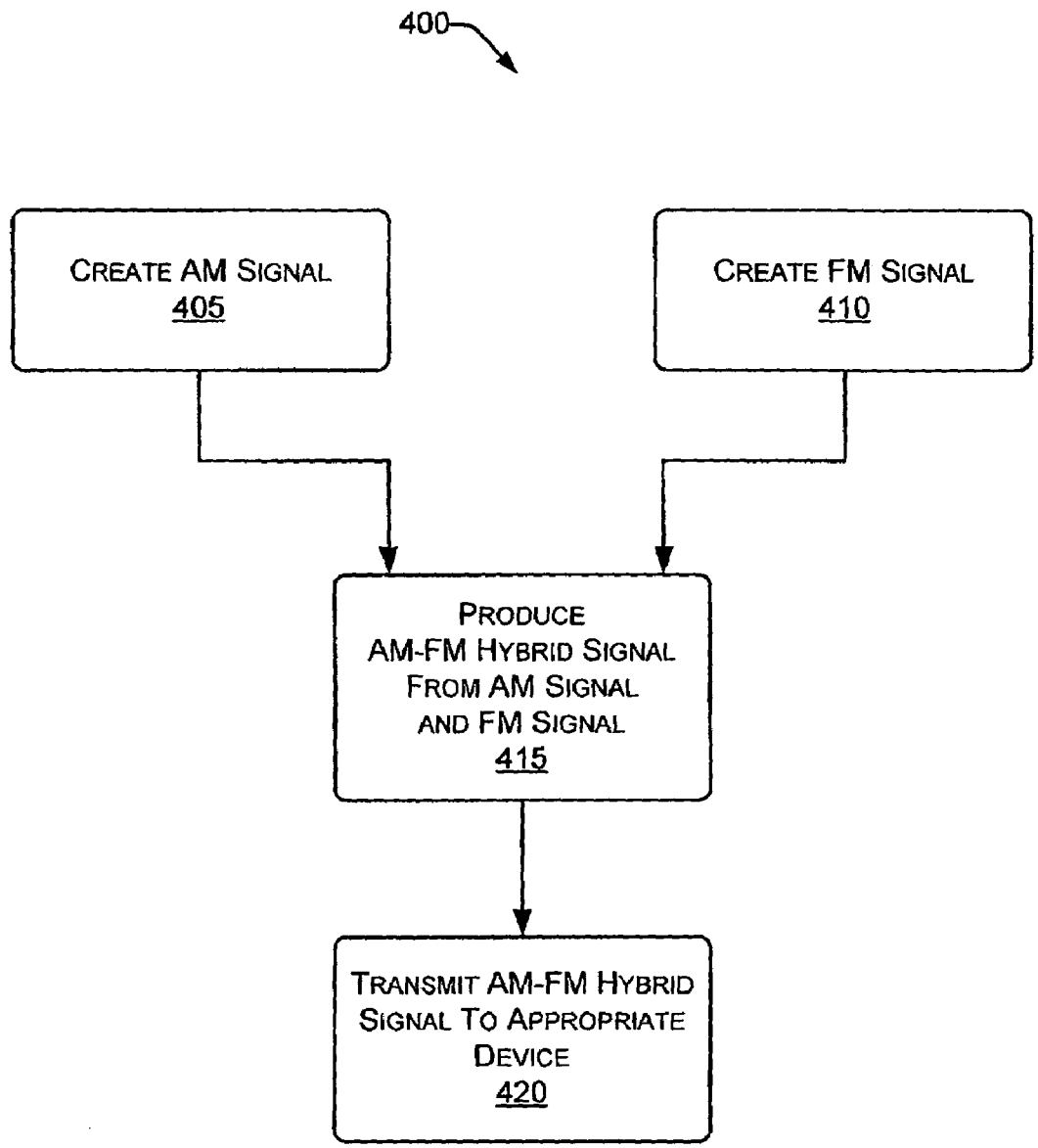
FIG. 4 is an illustration of a flow diagram to provide an AM-FM hybrid signal from the wireless link of FIG. 1.

FIG. 4 shows a flow diagram 400 which may be implemented for a wireless link according to an embodiment of the present invention. The flow diagram 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. The flow diagram 400 is described with reference to wireless link 135 described above. Although described as a flow diagram, it is contemplated that certain processes may take place concurrently or in a different order.

At block 405, an AM signal is created. The AM signal is representative of information to be sent to an RFID tag, such as RFID tags 105. The AM signal is used to adjust any other signal it is combined in the amplitude domain, therefore keeping the AM information conveyed by the created AM signal. In one implementation, the AM signal is created by the ASK pulse shaper 215 of FIG. 2.

At block 410, an FM signal is created. The FM signal is representative of to be sent to a wireless device that communicates using (i.e., receives) FM signals, such as a WLAN device. The created FM signal may also be used in providing a properly spaced AM-FM hybrid signal that conveys correct signal information to the RFID tags 105. The FM signal may be created, for example, by the frequency modulator 220 of FIG. 2.

At block 415, the AM signal and FM signal are received and an AM-FM hybrid signal is produced. In particular, the AM signal is used to determine the amplitude domain of the AM-FM hybrid signal and the FM signal is used to determine the frequency domain of the AM-FM hybrid signal. The AM-FM hybrid signal may be used to either communicate with the RFID tag or the wireless device that communicates using FM signals. For example, the AM-FM hybrid signal generator 140 of FIG. 2 may produce the AM-FM hybrid signal.

At block 420, a determination is made as to a particular device, a particular RFID tag or a particular wireless device, to receive the AM-FM hybrid signal. The AM-FM hybrid signal is transmitted to the particular device. The determination may be made by processor 200 of FIG. 2. The transmission of the AM-FM signal may be performed using the bandpass filter 245 and antenna 250 of FIG. 2.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component.

What is claimed is:

1. A wireless link system comprising:
   a pulse shaper to provide an amplitude modulated (AM) signal, wherein the AM signal is used to communicate with a Radio Frequency Identification (RFID) tag;
   a frequency modulator to provide an frequency modulation (FM) signal, wherein the FM signal is used to communicate with a wireless device;
   an AM-FM hybrid signal generator to generate an AM-FM hybrid signal comprising an AM signal provided by the pulse shaper and an FM signal provided by the frequency modulator, the AM-FM hybrid signal generator further transmitting the AM-FM hybrid signal to both the RFID tag and the wireless device, wherein the frequency modulator provides the FM signal in response to a signal received from the wireless device, and
   a power splitter that splits the AM-FM hybrid signal into a first signal and a second signal, wherein the first signal is transmitted to at least one of the RFID tag or the wireless device, and the second signal is used as a as part of a receive chain process to support received signals.

2. The system of claim 1 wherein the AM-FM hybrid signal generator comprises an amplifier whose gain is adjusted in amplitude domain by the AM signal.

3. The system of claim 1, wherein the pulse shaper provides the AM signal to adjust amplitude gain of the AM-FM hybrid signal.

4. The system of claim 1, further comprising an RF mixer that down converts and receives the received signal based on the second signal of claim 1.

5. An wireless link apparatus comprising:
   a pulse shaper that provides an amplitude modulated (AM) signal to communicate with a Radio Frequency Identification (RFID) tag;
   a frequency modulator that provides a frequency modulated signal to communicate with a wireless device; and an antenna that receives an AM signal from the RFID tag and an FM signal from the wireless device, the antenna communicatively coupled with a AM-FM hybrid signal generator, wherein the antenna transmits an AM-FM hybrid signal generated by the AM-FM hybrid signal generator to a device, and a mixer that receives a portion of the AM-FM hybrid signal and a received signal, and cancels out transmit-path noise, phase noise, and effects from frequency shifting.

6. The apparatus of claim 5 wherein the pulse shaper is a digital to analog converter.

7. The apparatus of claim 5 wherein the pulse shaper provides the AM signal to query an RFID tag.

8. The apparatus of claim 5 wherein the mixer produces a signal used for received communications processes.

* * * * *